United States Patent
Lashinske (10) Patent No.: US 9,404,612 B2
(45) Date of Patent: Aug. 2, 2016

(54) ELECTRICAL CONNECTOR AND SYSTEM FOR ELECTRICAL OUTLET

(71) Applicant: Charles Mark Lashinske, Phoenix, AZ (US)

(72) Inventor: Charles Mark Lashinske, Phoenix, AZ (US)

( * ) Notice: Subject to any disclaimer, the term of this patent is extended or adjusted under 35 U.S.C. 154(b) by 169 days.

(21) Appl. No.: 14/285,242

(22) Filed: May 22, 2014

(65) Prior Publication Data

US 2015/0340811 A1 Nov. 26, 2015

(51) Int. Cl.
| | |
|---|---|
| H01R 13/62 | (2006.01) |
| F16L 37/26 | (2006.01) |
| F16M 13/02 | (2006.01) |
| F16L 23/032 | (2006.01) |
| H01R 13/629 | (2006.01) |
| H01R 13/639 | (2006.01) |
| A47G 1/16 | (2006.01) |
| A47G 1/20 | (2006.01) |
| F16M 11/04 | (2006.01) |

(52) U.S. Cl.
CPC ............. *F16L 37/26* (2013.01); *A47G 1/1606* (2013.01); *A47G 1/205* (2013.01); *F16L 23/032* (2013.01); *F16M 11/041* (2013.01); *F16M 13/02* (2013.01); *H01R 13/629* (2013.01); *H01R 13/6395* (2013.01); *F16L 2201/40* (2013.01); *Y10T 29/49828* (2015.01)

(58) Field of Classification Search
CPC ............. H01R 13/629; H01R 13/6395; H01R 25/006; H01R 9/2408
USPC ................... 439/373, 535, 28, 292, 717, 284
See application file for complete search history.

(56) References Cited

U.S. PATENT DOCUMENTS

| | | | |
|---|---|---|---|
| 409,893 A | 8/1889 | Wray | |
| 733,050 A | 7/1903 | Moore | |
| 1,130,324 A | 3/1915 | Owen | |
| 1,182,610 A | 5/1916 | Wiesman | |
| 2,382,589 A | 8/1945 | Trevisan | |
| 2,520,221 A | 8/1950 | Ponty | |
| 2,549,534 A | 4/1951 | Shultz | |
| 2,793,407 A | 5/1957 | Johnston | |
| 3,589,755 A | 6/1971 | King | |
| 3,589,758 A * | 6/1971 | King | E04B 1/6141 403/231 |
| 4,019,298 A | 4/1977 | Johnson, IV | |
| 4,564,732 A | 1/1986 | Lancaster et al. | |
| 5,060,898 A | 10/1991 | Chang | |
| 5,244,300 A | 9/1993 | Perreira et al. | |
| 5,369,565 A * | 11/1994 | Chen | H02J 7/0042 224/902 |
| 5,433,416 A | 7/1995 | Johnson | |
| 5,524,394 A | 6/1996 | Szabo et al. | |
| 5,551,795 A * | 9/1996 | Engibarov | B23Q 1/28 269/73 |
| 5,619,074 A * | 4/1997 | Berch | B60R 25/04 180/287 |
| 5,664,793 A | 9/1997 | Engibarov | |
| 6,233,167 B1 * | 5/2001 | Chen | H01R 13/6675 363/146 |
| 6,290,304 B1 | 9/2001 | Lashinske | |
| 6,357,194 B1 | 3/2002 | Jones, Jr. | |
| 6,607,408 B2 * | 8/2003 | Milan | G06F 13/4095 361/732 |

(Continued)

*Primary Examiner* — Hae Moon Hyeon
(74) *Attorney, Agent, or Firm* — Weiss & Moy, P.C.; Veronica-Adele R. Cao; Jeffrey D. Moy (57) ABSTRACT

An electrical connector has a male portion having a center channel passing therethrough and having a dovetail tenon. The center channel of the male portion is configured to hold an electrical cord of a power consuming device. A female portion has a center channel passing therethrough and a dovetail mortise adapted to mate with the dovetail tenon. The center channel of the female portion is configured to hold electrical wires from an electrical power source.

16 Claims, 5 Drawing Sheets

(56) References Cited

U.S. PATENT DOCUMENTS

| | | | |
|---|---|---|---|
| 6,736,658 B2 * | 5/2004 | Milan | G06F 13/4095 363/146 |
| 7,204,723 B2 * | 4/2007 | Sun | H01R 13/514 439/701 |
| 7,753,740 B2 * | 7/2010 | Carolis | H01R 9/2408 439/717 |

* cited by examiner

ELECTRICAL CONNECTOR AND SYSTEM FOR ELECTRICAL OUTLET

CROSS-REFERENCE TO RELATED APPLICATIONS

This application is related to U.S. application Ser. No. 11/324,948 filed on Jan. 4, 2006 in the name of the Applicant, which is now abandoned. This application is also related to U.S. application Ser. No. 10/184,489 filed on Jun. 27, 2002 in the name of the Applicant, which is now abandoned. This application is also related to U.S. Pat. No. 6,290,304 issued on Sep. 18, 2001 to Applicant.

FIELD OF THE INVENTION

This disclosure generally relates to a connector and more particularly to an electrical outlet and connector and system therefor.

BACKGROUND OF THE INVENTION

Electrical outlets are designed so that plugs are inserted perpendicularly into the socket. This oftentimes causes electrical cords to stick out, which is not aesthetically pleasing. This design also requires that a generous amount of space be left between furniture and the electrical socket so that a plug may be inserted and removed from the electrical outlet. For example, a bed may not be pushed all the way up against a wall because it may block an electrical outlet that a person may want to use for a reading lamp. The user may therefore be required to leave about 4 inches between the bed and the wall, thus wasting the space between the bed and the wall.

Electrical outlets currently used today are also potentially hazardous. There may be a risk that people, especially young children, may insert metal objects into the socket and potentially get shocked and/or electrocuted. Adults tend to "baby proof" their electrical outlets by inserting rubber plugs into them, but the rubber plugs are an added expense and can easily be removed, thereby exposing the outlet again.

SUMMARY OF THE INVENTION

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one embodiment of the present invention an electrical connector is disclosed. The electrical connector has a male portion having a center channel passing therethrough and having a dovetail tenon. The center channel of the male portion is configured to hold an electrical cord of a power consuming device. A female portion has a center channel passing therethrough and a dovetail mortise adapted to mate with the dovetail tenon. The center channel of the female portion is configured to hold electrical wires from an electrical power source.

In accordance with one embodiment of the present invention an electrical connector is disclosed. The electrical connector has a male portion having a center channel passing therethrough and having a dovetail tenon. The center channel of the male portion is configured to hold an electrical cord of a power consuming device. The dovetail tenon is integral to a face of the male portion and comprises: a top surface; a bottom surface; and a pair of spaced apart side surfaces; wherein the tenon is V-shaped. A female portion has a center channel passing therethrough and a dovetail mortise adapted to mate with the dovetail tenon. The center channel of the female portion is configured to hold electrical wires from an electrical power source. The dovetail mortise is a recess formed within a face of the female portion and comprises: a pair of spaced apart side surfaces; and a plurality of apertures formed through the face, wherein a first set of apertures house a first set of wires and a second set of apertures house a second set of wires, wherein the first set of wires provide power at a first voltage level and the second set of wires provide power at a second voltage level, wherein the mortise is V-shaped In accordance with another embodiment of the present invention, an electrical connector system is disclosed. The electrical connector system has a male portion having a center channel passing therethrough and having a dovetail tenon. The center channel of the male portion is configured to hold an electrical cord of a power consuming device. The dovetail tenon is integral to a face of the male portion and comprises: a top surface, a bottom surface; and a pair of spaced apart side surfaces, wherein the tenon is V-shaped. A female portion has a center channel passing therethrough and a dovetail mortise adapted to mate with the dovetail tenon. The center channel of the female portion is configured to hold electrical wires from an electrical power source, wherein the dovetail mortise is a recess formed within a face of the female portion and comprises: a pair of spaced apart side surfaces, and a plurality of apertures formed through the face, wherein a first set of apertures house a first set of wires and a second set of apertures house a second set of wires, wherein the first set of wires provide power at a first voltage level and the second set of wires provide power at a second voltage level, wherein the mortise is V-shaped. A control unit is coupled to the female connector and the electrical power source. The control unit stepping down a voltage level from the electrical power source to the first voltage level to the first set of wires, the control unit allowing power from the electrical power source to be sent at the second voltage level to the second set of wires when the male portion is connected to the female portion. An outlet box houses the control unit. The female portion is attached to a front surface of the outlet box.

DETAILED DESCRIPTION OF THE PREFERRED EMBODIMENTS

FIGS. 1-9 together show the electrical connector 10 and system of the present invention. In one embodiment, the electrical connector 10 may be used with an electrical outlet. However, it should be clearly understood that the electrical connector 10 may be used in any suitable electrical system.

Figure 1:
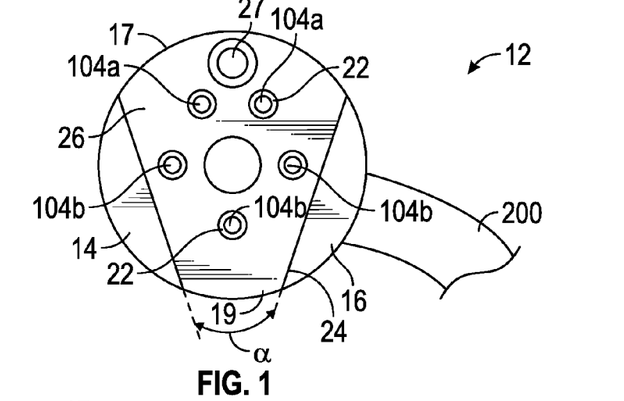
FIG. 1 is a front view of a plug with a male portion of an electrical connector in accordance with at least one embodiment of the present invention.
Figure 2:
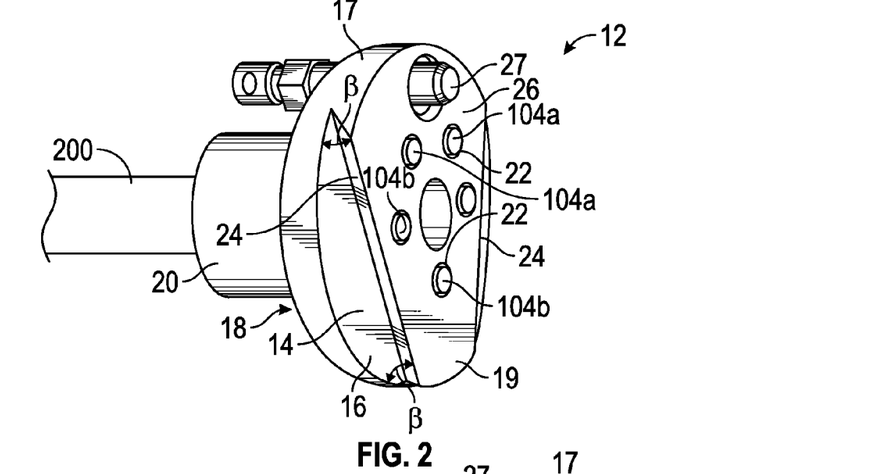
FIG. 2 is a left side perspective view of the male portion of the electrical connector of FIG. 1 shown with a locking mechanism in a deployed position.
Figure 3:
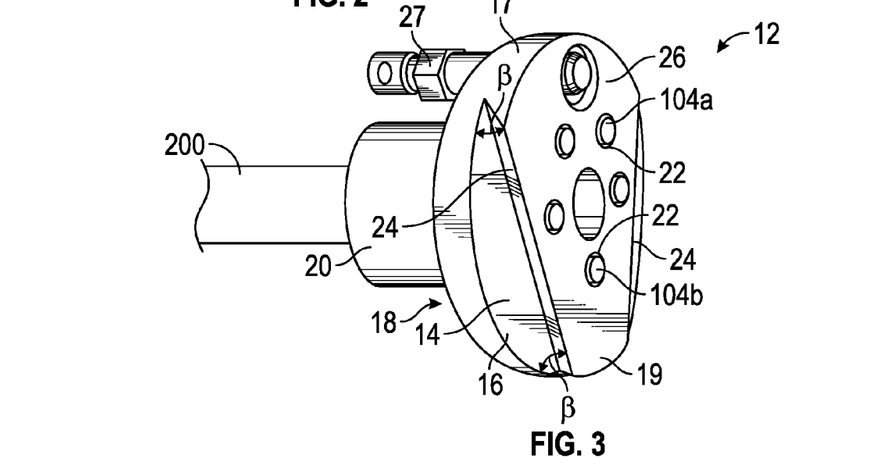
FIG. 3 is a left side perspective view of the male portion of the electrical connector of FIG. 1 shown with the locking mechanism in a retracted position.

In its simplest form, the electrical connector 10 may comprise a male portion 12 coupled to a power consuming device and a female portion 28 coupled to a power supply. Referring to FIGS. 1-3, the male portion 12 may have a face 14 and a conduit 20 that may extend from a rear surface 18 of the face 14 of the male portion 12 of the electrical connector 10. The face 14 of the male portion 12 of the electrical connector 10 may define one or more channels 22 for housing contacts 104a and may have one or more channels 22 for housing the contact points of wires 104b. Although it is shown in the figures that there are two contacts 104a and that the contacts 104a are positioned above the wires 104b, is should be clearly understood that any suitable number of contacts 104a may be used and that the contacts 104a and the wires 104b may be positioned in different configuration.

The wires 104b of the electrical cord 200 of the power consuming device may pass through the conduit 20 of the male portion 12 and out through the channels 22 in the face 14 of the male portion 12 of the electrical connector 10. Alternatively, the male portion 12 of the electrical connector 10 may be integral to the electric cord 200 of the power consuming device that is being plugged into the electrical outlet box 100. In another embodiment, the male portion 12 may not have a conduit 20 and the rear surface 18 of the face 14 of the male portion 12 may be coupled directly to or integral to the plug 200 of the power consuming device that is being plugged into the electrical outlet. In yet another embodiment, the male portion 12 may not have a conduit 20 and the rear surface 18 of the face 14 of the male portion 12 may be coupled directly to or integral to an electrical circuit/device such as an electrical charger (i.e. cellular phone charger and the like), a power supply (i.e., computer monitor power supply and the like).

A dovetail tenon 26 may be formed on a front surface 16 of the face 14 of the male portion 12 of the electrical connector 10. The tenon 26 may have a pair of spaced apart side surfaces 24, a top surface 17, and a bottom surface 19. As shown, the side surfaces 24 may be straight, the top surface 17 may be curved, and the bottom surface 19 may also be curved. In one embodiment, the tenon 26 may be V-shaped or tapered, wherein the width of the top surface 17 of the tenon 26 is greater than the width of the bottom surface 19 of the tenon 26. The side surfaces 24 may be positioned at a certain angle α relative to one another; the angle α being dependent upon the size of the male portion 12 of the electrical connector 10. For example, for a male portion 12 of an electrical connector 10 that has a diameter of approximately 1.25 in., the side surfaces 24 may be positioned at an angle α of approximately 37.5° relative to one another. This angle α formed by the two side surfaces 24 relative to one another may range between approximately 35.5° and approximately 39.5° for a 1.25 in. diameter male portion 12. The angle α formed between the side surfaces 24 relative to one another may vary according to the diameter of the male portion 12. It should be noted that if the angle α formed by the side surfaces 24 relative to one another is too great of an angle, then the male portion 12 and female portion 28 of the electrical connector 10 may stick together and may not easily disengage. It should also be noted that if the angle α formed by the side surfaces 24 relative to one another is too small, then a tight fit may not be created between the male portion 12 and the female portion 28 of the electrical connector 10 and they may be more easily dislodged.

Referring to FIGS. 2-3, the side surfaces 24 of the tenon 26 may form an angle β relative, to the front surface 16 of the face 14 of the male portion 12. In the embodiment shown in FIGS. 2-3, the side surfaces 24 may form an angle β of approximately 45° with the front surface 16 of the face 14 of the male portion 12 of the electrical connector 10. It should be clearly understood, however, that substantial benefit may be derived from the side surfaces 24 of the tenon 26 and the front surface 16 of the face 14 of the male portion 12 forming an angle β between approximately 30° and approximately 60°.

The tenon 26 may have a thickness (height) that may also vary according to the size of the male portion 12 of the electrical connector 10. In one embodiment, the tenon 26 may have a thickness of approximately 1/16 in. In one embodiment the tenon 26 may have the same thickness as a dovetail mortise 40 (described below) on the female portion 28 of the electrical connector 10. For example, where the mortise 40 of the female portion 28 may have a thickness of approximately 1/16 in., the tenon 26 of the male portion 12 may also have a thickness of approximately 1/16 in. The tenon 26 on the front surface 16 of the face 14 of the male portion 12 of the electrical connector 10 is configured to engage and mate with the mortise 40 on the front surface 32 of the face 30 of the female portion 28 of the electrical connector 10.

Figure 4:
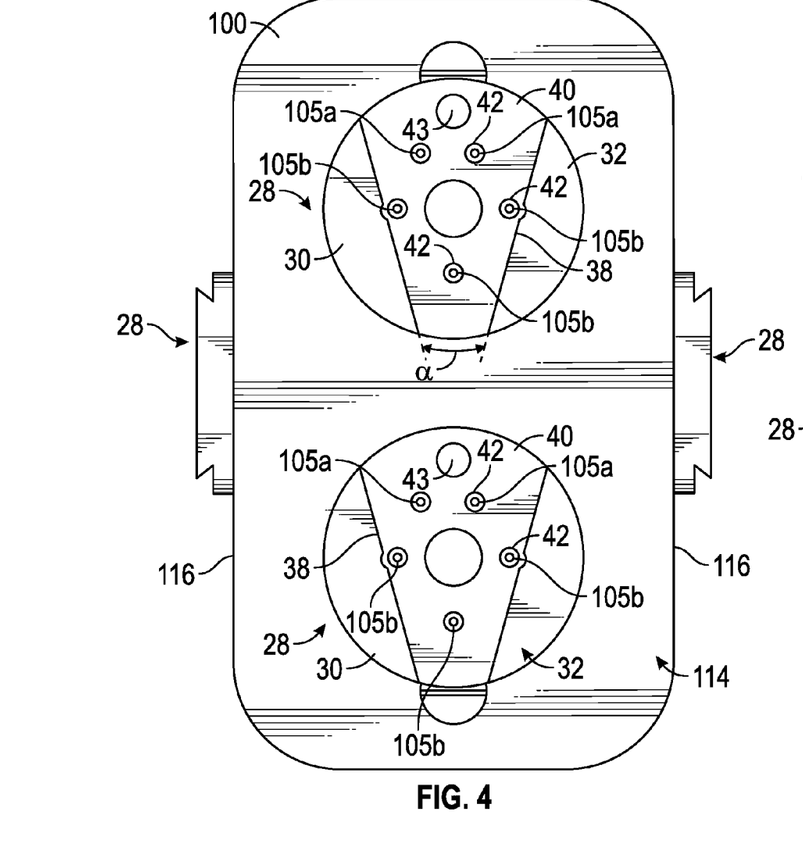
FIG. 4 is a front view of an electrical outlet box with the female portions of several electrical connectors in accordance with at least one embodiment of the present invention.
Figure 7:
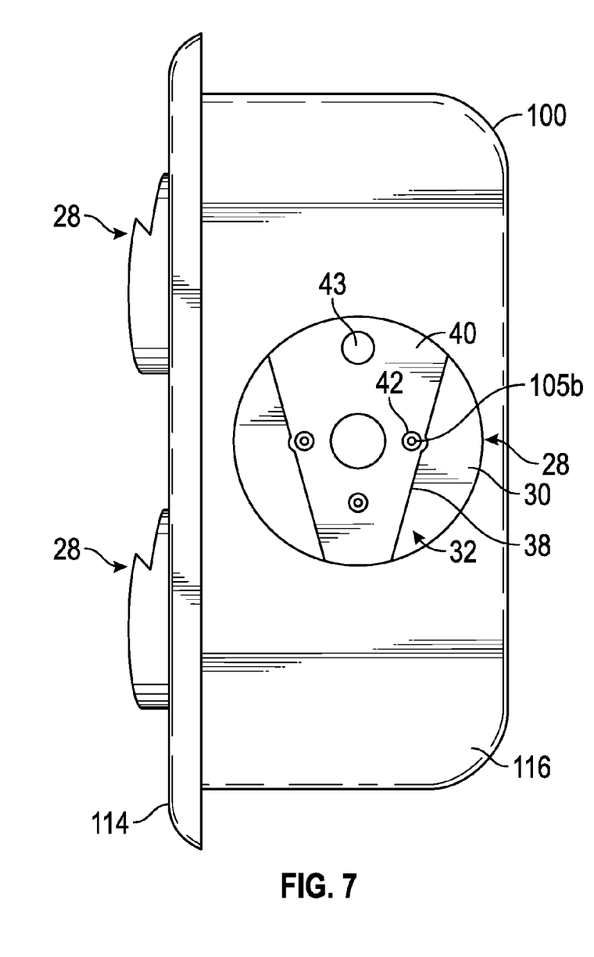
FIG. 7 is a right, side view of the electrical outlet of FIG. 4.
Figure 8:
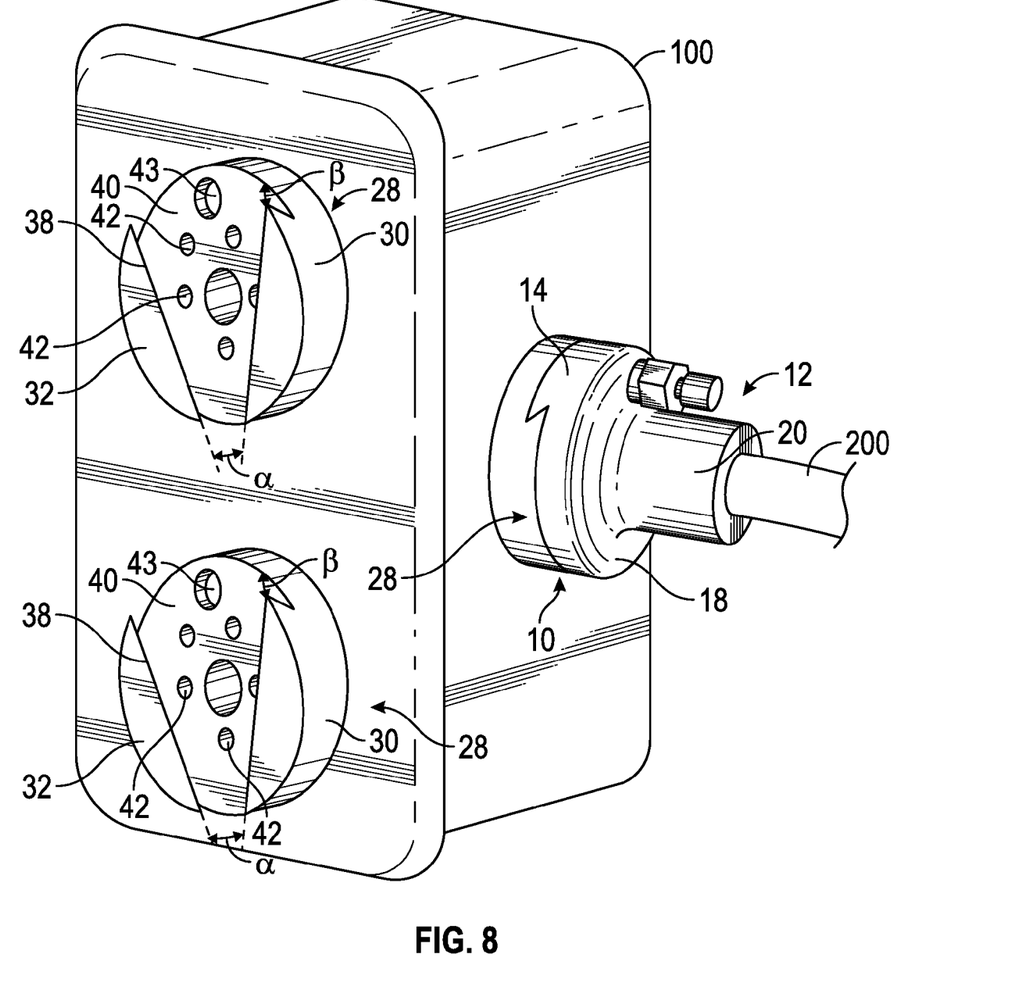
FIG. 8 is a perspective view of the electrical outlet box shown with a male portion of the electrical connector coupled to the female portion of the electrical connector.

Referring to FIGS. 4-8, the female portion 28 of the electrical connector 10 may have a face 30 and a conduit 36 extending from a rear surface 34 of the face 30 of the female portion 28 of the electrical connector 10. The face 30 of the female portion 28 of the electrical connector 10 may define a plurality of channels 42 for housing a plurality of electrical wires 105a, 105b. As shown in FIGS. 4 and 8, the female portion 28 may have one or more channels 42 for housing a first set of wires 105a and may have one or more channels 42 for housing a second set of wires 105b.

The conduit 36 of the female portion 28 may pass through an aperture 110 in the electrical outlet box 100 and the conduit 36 of the female portion 28 may be threaded so that it may be secured to the electrical outlet box 100 with a bolt 112 or other suitable securing device. Alternatively, the female portion 28 of the electrical connector 10 may be integral to the electrical outlet box 100. In another embodiment, the female portion 28 may not have a conduit 36 and the rear surface 34 of the face 30 of the female portion 28 may be coupled directly to or integral to the electrical outlet box 100.

As shown, a dovetail mortise 40 may be formed within a front surface 32 of the face 30 of the female portion 28 of the electrical connector 10. The mortise 40 is configured to mate with the dovetail tenon 26 of the male portion 12 of the electrical connector 10. The mortise 40 may have a pair of spaced apart side surfaces 38 recessed into the face 30 of the female portion 28 of the electrical connector 10. In one embodiment, the mortise 40 may be V-shaped or tapered, wherein the width of a top portion of the mortise 40 is greater than the width of a bottom portion of the mortise 40. The side surfaces 38 may be positioned at a certain angle α relative to one another; the angle α being dependent upon the size of the female portion 28 of the electrical connector 10. For example, for a female portion 28 of an electrical connector 10 that has a diameter of approximately 1.25 in., the side surfaces 38 may be positioned at an angle α of approximately 37.5° relative to one another. This angle α formed by the two side surfaces 38 relative to one another may range between approximately 35.5° and approximately 39.5° for a 1.25 in diameter female portion 28. The angle α formed between the side surfaces 38 relative to one another may vary according to the diameter of the female portion 28. It should be noted that if the angle α formed by the side surfaces 38 relative to one another is too great of an angle, then the male portion 12 and female portion 28 of the electrical connector 10 may stick together and may not easily disengage. It should also be noted that if the angle α formed by the side surfaces 38 relative to one another is too small, then a tight fit may not be created between the male portion 12 and the female portion 28 of the electrical connector 10 and they may be more easily dislodged. Generally, the angle α formed by the side surfaces 38 of the mortise 40 relative to one another may be equal to the angle α formed by the side surfaces 24 of the tenon 26 relative to one another to help ensure a proper fit between the male portion 12 and, the female portion 28.

Referring to FIG. 8, the side surfaces 38 of the mortise 40 may form an angle β relative to the front surface 32 of the face 30 of the female portion 28. The side surfaces 38 may form an angle β of approximately 45° with the front surface 32 of the face 30 of the female portion 28 of the electrical connector 10. It should be clearly understood, however, that substantial benefit may be derived from the side surfaces 38 of the mortise 40 and the front surface 32 of the face 30 of the female portion 28 forming an angle β between approximately 30° and approximately 60°. Generally, the angle β formed by the side surfaces 38 of the mortise 40 with the front surface 32 of the face 30 of the female portion 28 may be equal to the angle β formed by the side surfaces 24 of the tenon 26 with the front surface 16 of the face 14 of the male portion 12. This will help to ensure a tight fit between the male portion 12 and the female portion 28.

The mortise 40 may have a thickness (depth) that may also vary according to the size of the female portion 28 of the electrical connector 10. In one embodiment, the mortise 40 may have a thickness of approximately 1/16. In one embodiment the mortise 40 may have the same thickness as the dovetail tenon 26 (described above) on the male portion 12 of the electrical connector 10. For example, where the tenon 26 of the male portion 12 may have a thickness of approximately 1/16 in., the mortise 40 of the female portion 28 may also have a thickness of approximately 1/16 in. The mortise 40 on the front surface 32 of the face 30 of the female portion 28 of the electrical connector 10 is configured to engage the tenon 26 on the front surface 16 of the face 14 of the male portion 12 of the electrical connector 10.

As described herein, the electrical connector 10 of the present invention may be used with an electrical outlet. Although FIGS. 4-8 show the electrical outlet box 100 as being configured for use with a plurality of electrical connectors 10, it should also be clearly understood that the electrical outlet box 100 may be configured for use with only one electrical connector 10. Here, in FIG. 4, the electrical outlet box 100 has two female portions 28 coupled to a front portion 114 of the box 100 and one female portion 28 coupled to each of the sides 116 of the box 100. It should be clearly understood, however, that substantial benefit may be derived from the use of any number of female portions 28 coupled to the box 100. It should also be further understood that substantial benefit may still be derived from the female portions 28 being coupled to any part of the box 100, i.e. front 114, sides 116, top and/or bottom. The female portions 28 may be oriented so that the narrowest portion of the mortise 40 is positioned at the bottom and pointing downwardly. However, it should also be clearly understood that substantial benefit may still be derived with the female portions 28 being oriented in any direction.

The face 30 of the female portion 28 of the electrical connector 10 may also have a locking hole 43, which may be engaged by a locking pin 27 (see FIG. 2) that may be present on the male portion 12 of the electrical connector 10. The locking hole 43 is shown as being positioned near a top portion of the mortise 40 of the face 30 of the female portion 28. However, it should be clearly understood that the locking hole 43 may be positioned at any desired location on the female portion 28 of the electrical connector 10. Accordingly, the face 14 of the male portion 12 of the electrical connector 10 may have a locking pin 27 to engage the locking hole 43 on the face 30 of the female portion 28 of the electrical connector 10. The locking pin 27 is shown as being positioned near a top portion of the tenon 26 of the face 14 of the male portion 12. However, it should be clearly understood that the locking pin 27 may be positioned at any desired location on the face 14 of the male portion 12 of the electrical connector 10 as long as it is positioned to align with a locking hole 43 (described below) on the face 30 of the female portion 28 of the electrical connector 10. It should also be clearly understood that substantial benefit may nevertheless be derived from an electrical connector 10 that does not use a locking pin 27 and locking hole 43 or any other type of locking mechanism.

Figure 5:
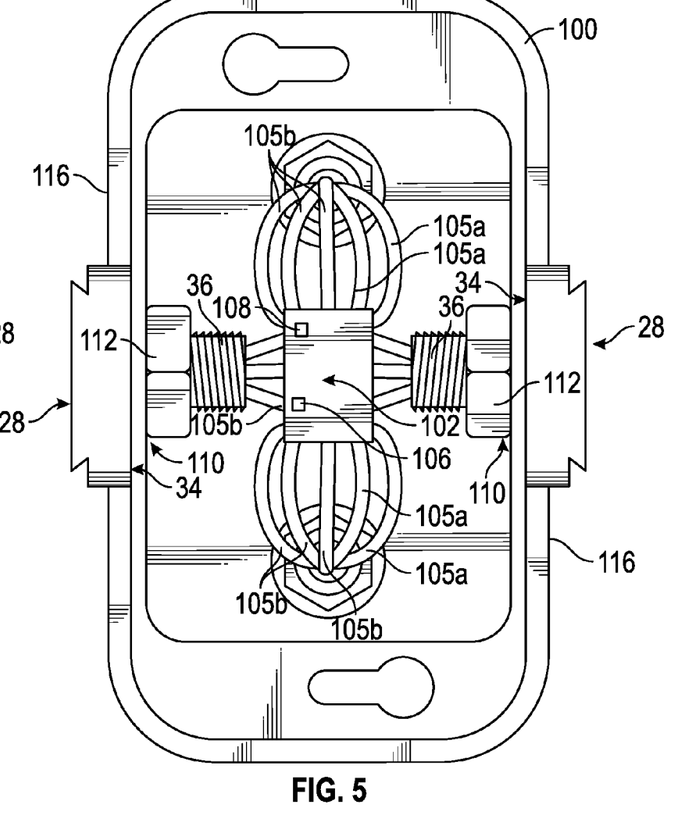
FIG. 5 is a rear view of the electrical outlet box of FIG. 4.
Figure 6:
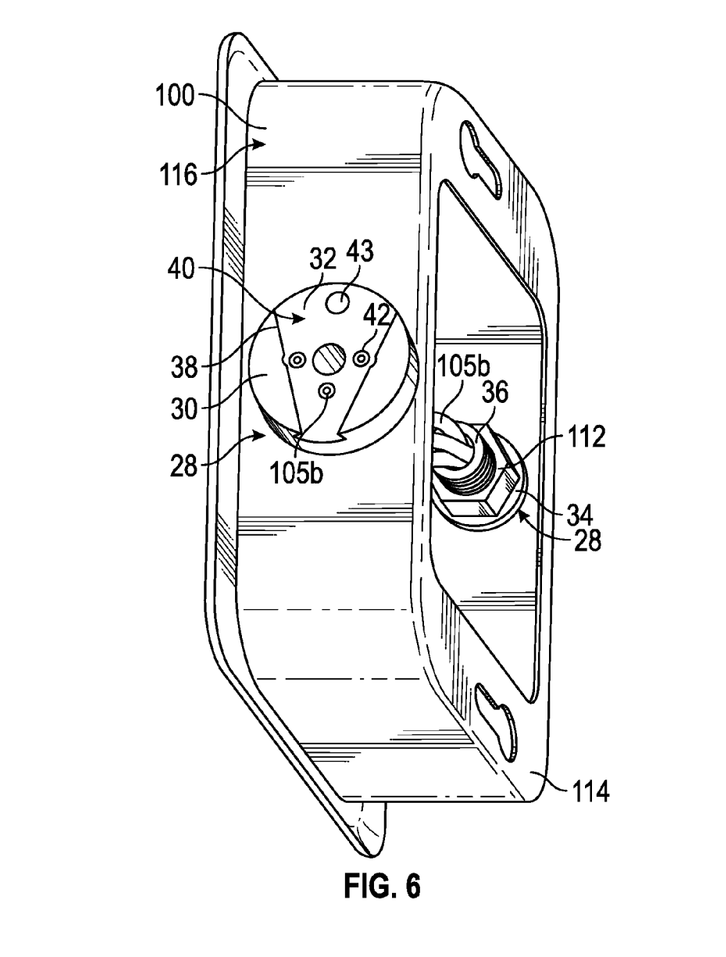
FIG. 6 is a rear perspective view of the electrical outlet box of FIG. 4.

Referring to FIG. 4-5, and described above, the female portion 28 on the front portion 114 of the outlet box 100 may have one or more channels 42 for housing the contact points of the first set of wires 105a coupled to the control unit 102 and may have one or more channels 42 for housing the contact points of the second set of wires 105b also coupled to the control unit 102. The control unit 102 (see FIG. 5) may be used to step down the voltage level of the power that is entering into the control unit 102. The control unit 102 may step down the voltage transmitted to the first set of wires 104a that pass through the conduit 36 and that are housed within the channels 42 of the face 30 of the female portion 28 of the electrical connector 10. In this embodiment, the control unit 102 may cause voltage level of the power from the power supply to be stepped down to a lower voltage level which would minimize electric shock. The control unit 102 may cause voltage level of the power from the power supply to be stepped down to a voltage level of 30 volts or less. In accordance with one embodiment, the control unit 102 may cause voltage level of the power from the power supply to be stepped down to a voltage level of 12V or lower before it is delivered to the first set of wires 105a. The control unit 102 may allow the power from the power supply to flow through to the second set of wires 105b. Thus, the control unit 102 may allow a power level of 110 V or 220V, to be delivered to the second set of wires 105b directly from the power supply without stepping down the voltage.

In one embodiment, the control unit 102 may a step down transformer 108 and a switch 106 that controls the voltage level of the power output. Initially, the power from the power supply may have a given voltage, such as 110V or 220V. The control unit 102 may use the step down transformer 108 or other such device to step down the voltage to a lower level, such as 12V or lower, before it is delivered to the first set of wires 105a. Once the contact points of the first set of wires 105a of the female portion 28 come into contact with the contacts 104a of the male portion 12 of the electrical connector 10, the switch 106 reroutes the power so that it is no longer stepped down; instead, the power is rerouted directly from the power supply to the second set of wires 105b. The switch 106 may cause the power that was delivered to the low voltage wires 104a to cease so that power is only delivered to the second set of wires 105b. This is a safety feature of the present invention which makes the face 30 of the female portions 28 on the front 114 of the electrical outlet box 100 safe to touch. It should be clearly understood, however, that substantial benefit may still be derived from an electrical connector 10 without this safety feature; i.e. all of the female portions 28 on the front 114 of the electrical outlet box 100 may have only the second set of wires 105b available; thus it would not be necessary to step down the voltage.

In the embodiment shown in the figures, a combination may be used wherein the female portions 28 on the front 114 of the electrical outlet box 100 have the safety feature of low voltage on the first set of wires 105a and a high voltage on the second set of wires 105b while the female portions 28 on the sides 116 of the electrical outlet box 100 (which may be used to connect a series of electrical outlet boxes 100 to each other and would typically be housed within the wall and not exposed) may have only the higher voltage second set of wires 104b. The second set of wires 105b of the female portions 28 coupled to the sides 116 of the electrical outlet box 100 may bypass the control unit 102 and may deliver power directly from the power supply.

In an alternative embodiment, the female portion 28 may have one or more channels 42 for housing the second set of wires 105b only. The second set of wires 105b may be slightly recessed within the channels 42 on the face 30 of the female portion 28 for safety purposes. The face 14 of the male portion 12 of the electrical connector 10 may have pogo pins coupled to and extending therefrom and the pogo pins would be coupled to the wires 104b that is also coupled to the power consuming device that is to be plugged into the electrical outlet box 100. The pogo pins on the face 14 of the male portion 12 may be configured to engage the channels 42 on the face 30 of the female portion 28. When a user slides the dovetail tenon 26 into the dovetail mortise 40 and connects the male portion 12 to the female portion 28, the pogo pins may initially retract so that the tenon 26 will engage the mortise 40. When the male portion 12 engages the female portion 28, the pogo pins of the male portion 12 may then extend out and enter into the channels 42 of the female portion 28, thereby connecting with the second set of wires 105b within the channels 42 of the female portion 28.

As shown in FIGS. 7-8, the side surfaces 24 of the male portion 12 and the side surfaces 38 of the female portion 28 may have sharp edges. It should be clearly understood, however, that substantial benefit may still be derived if these edges were more rounded in order to provide tensile strength to the electrical connector 10.

The male portion 12 and the female portion 28 of the electrical connector 10 may each have a gage point. The gage point is a reference point used to position the male portion 12 in relation to the female portion 28 so that tight connection is created between them. Specifically, for the female portion 28, the gage point is measured from the center point of the face 30 of the female portion 28 to a point on the side surface 38 of the mortise 40. On the female portion 28, the height of the gage point is typically located at a point that is half the thickness (depth) of the mortise 40 and its distance from the center point of the face 30 of the female portion 28 depends upon the diameter of the face 30 of the female portion 28 and the angle β formed by the side surface 38 with the face 30 of the female portion 28. Once the gage point of the female portion 28 is determined, the gage point of the male portion 12 may be made equal to the gage point of the female portion 28. The gage point generally varies according to the size of the objects being connected, the shape of the electrical connector 10, and the desired strength of the electrical connector 10.

The electrical connector 10 of the present invention may also have a locking mechanism. When the male portion 12 and female portion 28 are coupled, the locking pin 27 on the face 14 of the male portion 12 may engage the locking hole 43 on the face 30 of the female portion 28. The locking pin 27 may be spring loaded for safety purposes, wherein the locking pin 27 would need to be retracted in order to disconnect the male portion 12 of the electrical connector 10 from the female portion 28 of the electrical connector 10. It should be clearly understood, however, that any type of suitable locking mechanism may be used with the present invention. It should also be clearly understood that substantial benefit may nevertheless be derived from an electrical connector 10 that does not use a locking pin 27/locking hole 43 or use any other type of locking mechanism.

Figure 9:
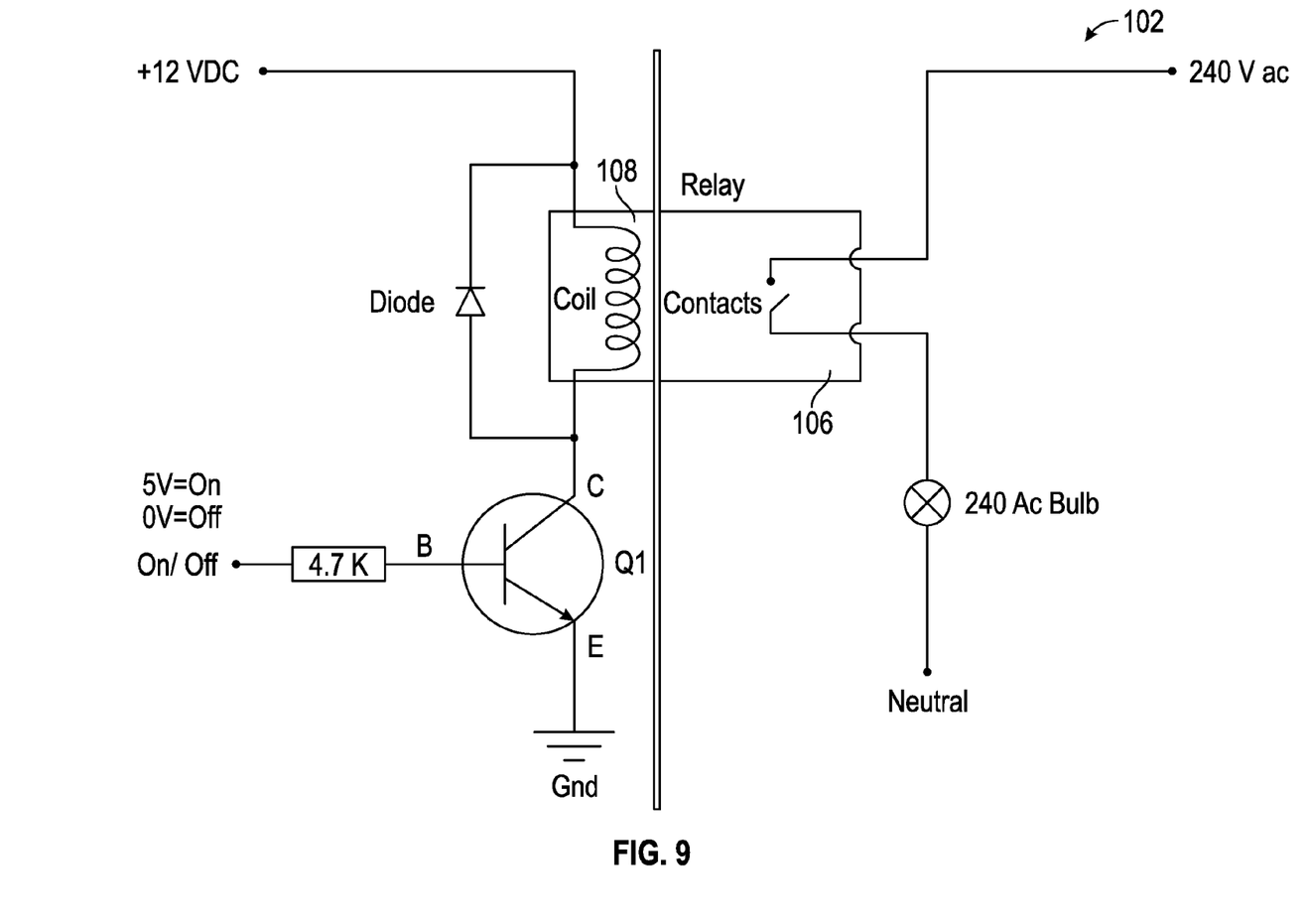
FIG. 9 is a circuit diagram of a circuit using the electrical connector of the present invention.

FIG. 9 is a circuit diagram of one embodiment of the control unit 102 which may be used with the electrical connector 10 of the present invention. As described above, the control unit 102 may have a switch 106 that controls the voltage of the power output. Initially, the power from the power supply may have a voltage of 110V or 220V. The control unit 102 may use a transformer 108 or other such device to step down the voltage to a lower level, such as 12V or lower, before it is delivered to the first set of wires 105a. Once the contact points of the first set of wires 104a of the female portion 28 come into contact with the contacts 104a of the male portion 12 of the electrical connector 10, then the electrical circuit is completed, and the switch 106 then reroutes the power so that it is no longer stepped down; instead, the power is rerouted directly from the power supply to the second set of wires 105b. The switch 106 may also cause all power that was delivered to the first set of wires 105a to cease so that power is only delivered to the second set of wires 105b. Although an example of an electrical circuit is shown herein, it should be clearly understood, that the electrical connector 10 may be used with any type of suitable electrical circuit.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public.

What is claimed is:

1. An electrical connector comprising:
   a male portion having a center conduit passing therethrough and having a dovetail tenon, the center conduit of the male portion configured to hold an electrical cord of a power consuming device, wherein the dovetail tenon is integral to a face of the male portion and comprises:
      a top surface;
      a bottom surface;
      a pair of spaced apart side surfaces;
      at least a pair of contacts; and
      a plurality of wires from the electrical cord; and
   a female portion having a center conduit passing therethrough and a dovetail mortise adapted to mate with the dovetail tenon, the center conduit of the female portion configured to hold electrical wires from an electrical power source, wherein the dovetail mortise is a recess formed within a face of the female portion and comprises:

a pair of spaced apart side surfaces; and a plurality of channels formed through the face, wherein a first set of channels house a first set of wires from the electrical power source and a second set of channels house a second set of wires from the electrical power source, wherein the first set of wires from the electrical power source provide power at a first voltage level and the second set of wires from the electrical power source provide power at a second voltage level; and wherein at least a pair of contact points of the first set of wires from the electrical power source are configured to come into contact with the pair of contacts of the male portion to complete an electrical circuit when the dovetail tenon of the male portion of the connector mates with the dovetail mortise of the female portion of the connector.

2. The connector of claim 1, wherein the pair of side surfaces of the male portion are positioned at an angle of between approximately 35.5° and approximately 39.7° relative to one another.

3. The connector of claim 1, wherein each of the side surfaces of the male portion forms an angle of between approximately 30° and 60° with a front surface of the face of the male portion.

4. The connector of claim 1, wherein the pair of side surfaces of the female portion are positioned at an angle of between approximately 35.5° and approximately 39.7° relative to one another.

5. The connector of claim 1, wherein each of the side surfaces of the female portion forms an angle of between approximately 30° and 60° with a front surface of the face of the female portion.

6. The connector of claim 1, further comprising a control unit coupled to the female portion and the electrical power source, the control unit stepping down a voltage level from the electrical power source to the first voltage level to the first set of wires, the control unit allowing power from the electrical power source to be sent at the second voltage level to the second set of wires when the male portion is connected to the female portion.

7. The connector of claim 6, wherein the control unit is housed within an outlet box, the female portion attached to a front surface of the outlet box.

8. The connector of claim 1, further comprising:

a locking pin coupled to the male portion; and a locking hole formed in the female portion, wherein the locking pin is configured to engage the locking hole.

9. An electrical connector comprising:

a male portion having a center conduit passing therethrough and having a dovetail tenon, the center conduit of the male portion configured to hold an electrical cord of a power consuming device, wherein the dovetail tenon is integral to a face of the male portion and comprises:

a top surface;

a bottom surface;

a pair of spaced apart side surfaces;

at least a pair of contacts; and a plurality of wires from the electrical cord;

wherein the tenon is V-shaped; and a female portion having a center conduit passing therethrough and a dovetail mortise adapted to mate with the dovetail tenon, the center conduit of the female portion configured to hold electrical wires from an electrical power source, wherein the dovetail mortise is a recess formed within a face of the female portion and comprises:

a pair of spaced apart side surfaces; and a plurality of channels formed through the face, wherein a first set of channels house a first set of wires from the electrical power source and a second set of channels house a second set of wires from the electrical power source, wherein the first set of wires from the electrical power source provide power at a first voltage level and the second set of wires from the electrical power source provide power at a second voltage level;

wherein the mortise is V-shaped;

wherein at least a pair of contact points of the first set of wires from the electrical power source are configured to come into contact with the pair of contacts of the male portion to complete an electrical circuit when the dovetail tenon of the male portion of the connector mates with the dovetail mortise of the female portion of the connector.

10. The connector of claim 9, wherein the pair of side surfaces of the male portion are positioned at an angle of between approximately 35.5° and approximately 39.7° relative to one another.

11. The connector of claim 9, wherein each of the side surfaces of the male portion forms an angle of between approximately 30° and 60° with a front surface of the face of the male portion.

12. The connector of claim 9, wherein the pair of side surfaces of the female portion are positioned at an angle of between approximately 35.5° and approximately 39.7° relative to one another.

13. The connector of claim 9, wherein each of the side surfaces of the female portion forms an angle of between approximately 30° and 60° with a front surface of the face of the female portion.

14. The connector of claim 9, further comprising a control unit coupled to the female portion and the electrical power source, the control unit stepping down a voltage level from the electrical power source to the first voltage level to the first set of wires, the control unit allowing power from the electrical power source to be sent at the second voltage level to the second set of wires when the male portion is connected to the female portion.

15. An electrical connector system comprising:

a male portion having a center conduit passing therethrough and having a dovetail tenon, the center conduit of the male portion configured to hold an electrical cord of a power consuming device, wherein the dovetail tenon is integral to a face of the male portion and comprises:

a top surface;

a bottom surface;

a pair of spaced apart side surfaces;

at least a pair of contacts; and a plurality of wires from the electrical cord;

wherein the tenon is V-shaped; and a female portion having a center conduit passing therethrough and a dovetail mortise adapted to mate with the dovetail tenon, the center conduit of the female portion configured to hold electrical wires from an electrical power source, wherein the dovetail mortise is a recess formed within a face of the female portion and comprises:

a pair of spaced apart side surfaces; and a plurality of channels formed through the face, wherein a first set of channels house a first set of wires from the electrical power source and a second set of channels house a second set of wires from the electrical power source, wherein the first set of wires from the electrical power source provide power at a first voltage level and the second set of wires from the electrical power source provide power at a second voltage level;

wherein the mortise is V-shaped; and wherein at least a pair of contact points of the first set of wires from the electrical power source are configured to come into contact with the pair of contacts of the male portion to complete an electrical circuit when the dovetail tenon of the male portion of the connector mates with the dovetail mortise of the female portion of the connector; and a control unit coupled to the female portion and the electrical power source, the control unit stepping down a voltage level from the electrical power source to the first voltage level to the first set of wires, the control unit allowing power from the electrical power source to be sent at the second voltage level to the second set of wires when the male portion is connected to the female portion; and an outlet box housing the control unit, the female portion attached to a front surface of the outlet box.

16. The connector of claim 15, further comprising:

a locking pin coupled to the male portion; and a locking hole formed in the female portion, wherein the locking pin is configured to engage the locking hole.

* * * * *